Jan. 31, 1928.　　　　　　　　　　　　　　1,657,732
R. R. WHITE
BEARING SUPPORT
Filed May 5, 1924
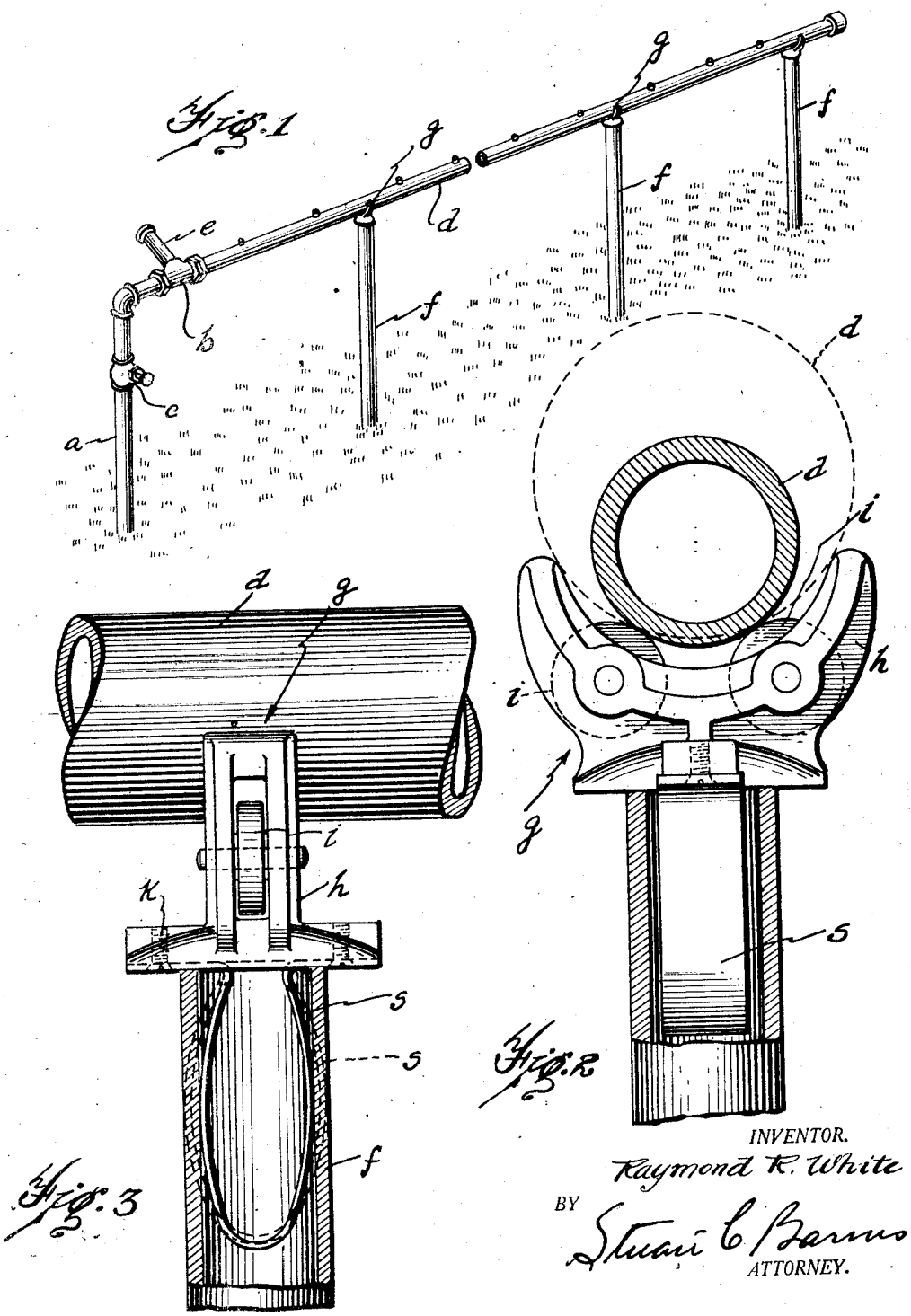
INVENTOR.
Raymond R. White
BY
ATTORNEY.

Patented Jan. 31, 1928.

1,657,732

UNITED STATES PATENT OFFICE.

RAYMOND R. WHITE, OF DETROIT, MICHIGAN, ASSIGNOR TO WHITE SHOWERS, INC., OF DETROIT, MICHIGAN, A CORPORATION OF MICHIGAN.

BEARING SUPPORT.

Application filed May 5, 1924. Serial No. 711,293.

This invention relates to a liquid distributing system or sprinkling apparatus and more particularly to the pipe support for supporting the rotating distributing pipe that carries the spraying nozzles. One object of this invention is to provide a pipe support that is detachably secured to the supporting standards and is so constructed that pipes of various diameters may be supported by the same pipe support. Another object is to provide a frictionless bearing to allow the long distributing pipe to be easily rotated to any desired position.

A further object is to provide means for securing the support to a tubular pipe section, without substantially changing the construction of the pipe support.

In the drawings:

Fig. 1 is a perspective view of one of the turning distributing pipes used in such an apparatus, showing my improved bearing supports for supporting the same.

Fig. 2 is an end elevation of one of these supports.

Fig. 3 is a side elevation of the same.

This liquid distributing system or sprinkling apparatus is suitably connected to a water main $a$ by the turning union $b$, the valve $c$ controlling the flow of water from the main through the turning union to the distributing pipe or irrigation pipe $d$. The construction of my turning union is described and claimed in my copending application Serial No. 711,294, filed May 5, 1924, and need not be here described. However, the operator by grasping the handle $e$ of the turning union may rotate the distributing pipe $d$ to position the same in any desired position so as to direct the water spray for the purpose of irrigating the surrounding ground. This rotating pipe is suitably supported at a plurality of points by the standards $f$ anchored in the ground. These standards are generally formed of tubular pipe sections and my bearing support designated $g$ is adapted to be detachably secured in the upper end of one of these pipe standards.

This bearing support comprises a casting $h$ which rotatably supports the rollers $i$. The casting is so shaped as to provide a concave recess on the top and the said rollers are adapted to project within this concave recess, one on each side of the center. The pipe $d$ rests on these rollers and it is obvious that the diameter of the pipe may vary without requiring a different size bearing support. In Fig. 2 is shown a dotted circle which may represent the largest size pipe that can be supported by my improved support.

Secured to the bottom of the casting is a pilot or spring clip $s$ which is adapted to be wedged within the hollow end of the pipe standard $f$. In Fig. 3, the spring clip is shown compressed in solid lines, the dotted line showing the position assumed by the spring clip when the same is disassembled from the standard. This will securely anchor the bearing support to the standard and prevent the same from accidently jumping out of the standard, but the same may be easily drawn out by hand when it is desired to remove the support for repairing the same or replacing with a new one. The weight of the distributing pipe $d$, of course tends to retain the spring within the standard. This spring clip may be riveted or otherwise secured to the casting, as at $k$.

The base of the support covers the open end of the tubular pipe standard thereby preventing water from entering the interior of the standard.

The frictional engagement of the spring clip permits the fixture to be positioned so that the axes of the rollers are parallel with the longitudinal axis of the pipe section.

What I claim is:

1. A bearing support for the purpose specified, having in combination a tubular support, a bracket provided with rollers for rotatably supporting long pipe sections of various diameters, and a spring clip secured to the bracket and adapted to be sprung within the tubular support and to frictionally engage the same for detachably securing the bracket to said support to permit the axes of the rollers to be disposed in parallelism with the axis of the long pipe sections.

2. A bearing support for the purpose specified, having in combination a support, a casting forming a bracket provided with a relatively deep concave recess at the top, a pair of rollers rotatably supported by the bracket and projected within the concave recess, one on each side of the center of the casting for rotatably supporting long pipe sections of various diameters, and means for frictionally and detachably securing the casting to the support to permit the axes of the rollers to be disposed in parallelism with respect to the axis of the pipe sections.

3. A bearing support for the purpose specified, having in combination, a support, a member provided with means for rotatably supporting long pipe sections of various diameters, spring clip fastening means for detachably mounting the member on said support to hold the member securely on the support and to permit the pipe supporting means to be correctly positioned with respect to the axis of the long pipe sections.

4. A bearing support for the purpose specified, having in combination, a support, a bracket provided with a pair of rollers for rotatably supporting pipe sections, and means carried by said bracket which is adapted to co-operate with the support and hold the bracket securely on said support, said means being such as to permit adjustment of the bracket whereby the axes of the rollers may be disposed in parallelism with respect to the axis of the long pipe sections.

5. A bearing support for overhead irrigating systems, having in combination a tubular support vertically directed, and a pipe supporting bracket arranged to rotatably support the pipe and provided with fastening means that may be removably plugged into the end of the tubular support by compression of the fastening means.

6. A bearing support for overhead irrigating systems, having in combination a tubular support vertically directed, and a pipe supporting bracket arranged to rotatably support the pipe and provided with a loop-like spring fastening means that may be removably plugged into the end of the tubular support.

In testimony whereof I have affixed my signature.

RAYMOND R. WHITE.